April 12, 1966 D. R. KIMBERLIN 3,245,282
PROGRESSIVELY ADJUSTABLE STEERING ASSEMBLY
Filed April 13, 1964 2 Sheets-Sheet 1

INVENTOR.
Dan R. Kimberlin
BY
W. J. Wagner
ATTORNEY

April 12, 1966  D. R. KIMBERLIN  3,245,282
PROGRESSIVELY ADJUSTABLE STEERING ASSEMBLY
Filed April 13, 1964  2 Sheets-Sheet 2

INVENTOR.
Dan R. Kimberlin
BY
W. F. Wagner
ATTORNEY

United States Patent Office 3,245,282
Patented Apr. 12, 1966

3,245,282
PROGRESSIVELY ADJUSTABLE STEERING
ASSEMBLY
Dan R. Kimberlin, Saginaw, Mich., assignor to General Motors Corporation, Detroit, Mich., a corporation of Delaware
Filed Apr. 13, 1964, Ser. No. 359,137
15 Claims. (Cl. 74—493)

This invention relates to adjustable steering assemblies and more particularly to steering assemblies capable of both telescoping and tilting adjustment.

In recent years, certain production passenger vehicles have adopted steering column assemblies enabling adjustment of the plane of rotation of the steering wheel to a range of positions out of linear alignment with the axis of rotation of the steering post. A preferred type of construction is shown in the copending aplication of Philip B. Zeigler and Robert D. Wight, Serial No. 221,833, filed September 6, 1962, entitled "Adjustable Steering Column," now U.S. Patent No. 3,167,971, issued February 2, 1965, and assigned to General Motors Corporation. In the construction shown in the noted application, the steering wheel is arranged for tilting movement about a transverse axis to inclined positions both above and below the position of axial alignment with the steering column. Manually operated latching means provide seven defined locked positions within this range. While the angular variation between each of the defined positions is relatively moderate to fully satisfy the requirements of vehicle operators of varying physical stature, it is desirable that the wheel be susceptible of infinite variation of locked positions between the upper and lower limits of tilt.

In addition, in order to further accommodate the comfort and convenience of various operators, it is desirable that the steering assembly provide for telescoping adjustment of the steering column in addition to the tilting function of the wheel, previously described.

An object of the present invention is to provide an improved adjustable steering assembly.

Another object is to provide a steering assembly which is capable of both telescoping and tilting adjustment.

A further object is to provide an assembly of the stated character wherein the telescoping and tilting adjustment may be effected either simultaneously or separately.

Yet a further object is to provide an arrangement of the type described wherein the telescoping and tilting positions are infinitely adjustable within the predetermined range of movement thereof.

A still further object is to provide a construction of the stated character in which locking and unlocking of the tilting and telescoping positions of adjustments is accomplished by a single frictional latching device.

Still another object is to provide a telescoping structure and a tilting structure in which the indexing elements therefore are arranged in cooperating relationship with a single latching device, which upon release enables the adjustments to be accomplished either simultaneously or separately.

These and other objects, advantages and features of the invention will become more readily apparent as reference is had to the accompanying specification and drawings wherein.

Figure 1:
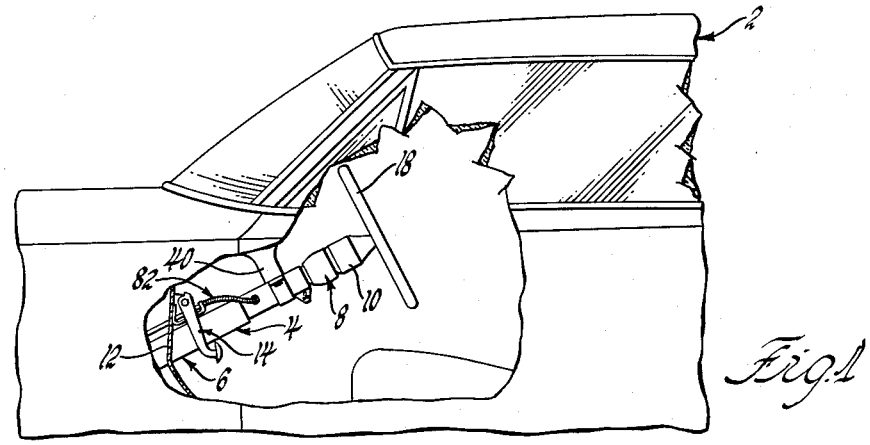
FIGURE 1 is a fragmentary plan view of a vehicle body with parts broken away to illustrate the position and general structural arrangement of a tilting and telescoping adjustable steering assembly in accordance with the invention.
Figure 2:
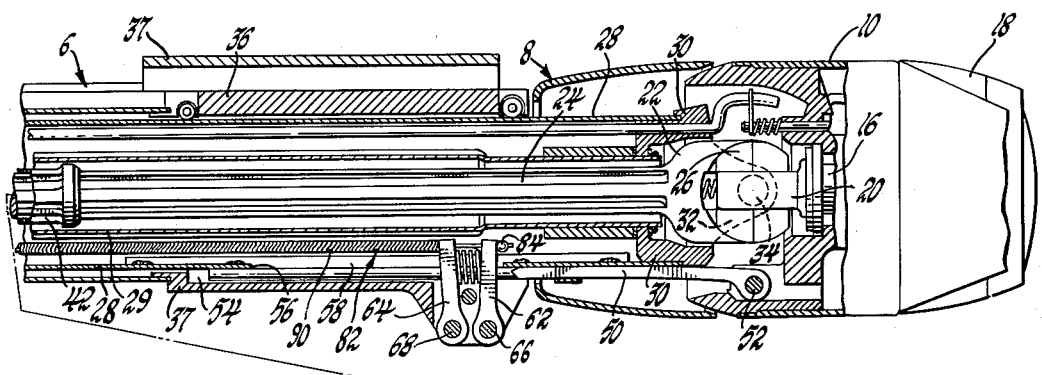
FIGURE 2 is an enlarged sectional elevational view showing details of the tilting and telescoping assembly.
Figure 2:
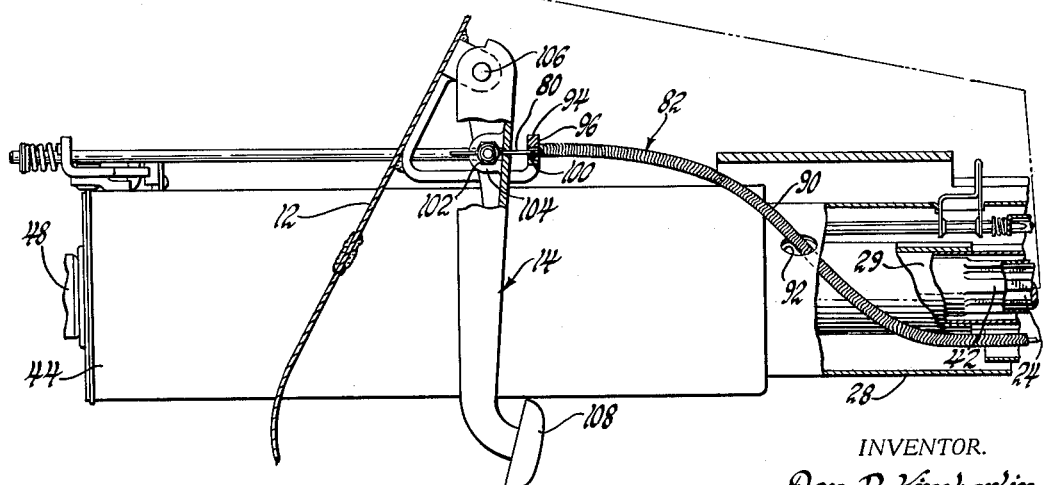

Referring now to the drawings and particularly FIGURE 1, there is shown a fragmentary portion of a vehicle 2 in which the reference numeral 4 generally designates a steering assembly comprising a fixed lower column 6, an intermediate column 8 telescopingly received within column 6, and an upper housing portion 10 adapted for tilting movement relative to column 8 about a transverse axis. Mounted on the vehicle fire wall 12 is a pendant pedal assembly 14 which is adapted, in a manner shortly to be described, to enable establishment and release of an infinite number of telescoping and tilting positions of the structure described.

In accordance with one feature of the invention, the tilting housing portion 10 has a stub shaft 16 rotatably supported therein to which is attached steering wheel 18. The lower end of stub 16 includes a yoke portion 20 which together with a corresponding yoke portion 22 formed on the upper end of splined steering shaft 24 cooperates with a split cross-slotted ball member 26 to enable the stub 16 to occupy any of a range of angular positions relative to shaft 24 while maintaining lash-free rotational engagement. For a more complete description of the universal connection thus established, reference may be had to copending application Serial No. 221,833, previously noted.

Spaced immediately axially below tiltable housing portion 10 is the inner jacket portion 28 of telescoping column 8, the upper end of which has secured thereto a support casting 30. Casting 30 includes transversely spaced ears 32 which project interiorly of housing 10, and are connected by trunnions 34 with the laterally opposite side walls of housing 10 to establish the transverse axis about which the steering wheel 18 is tiltable. Inner jacket 28 extends into and through a cylindrical bearing 36 formed in the upper end of column 6. Bearing 36 and the upper end of column 6 in turn are surrounded by a housing 37 which is secured to the vehicle instrument panel 38 by a bracket 40. Splined steering shaft 24 similarly projects downwardly through bearing 36 in concentric relation with jacket 28 for splined engagement with internal splines formed in the tubular upper end of lower steering shaft 42. A sheath 29 surrounds shaft 24 and overlaps the upper end of shaft 42. Shaft 42 in turn is rotatably mounted at the base 44 of fixed column 6 and the terminal end 48 thereof is adapted for operative connection with the usual power steering gear mechanism, not shown.

Figure 3:
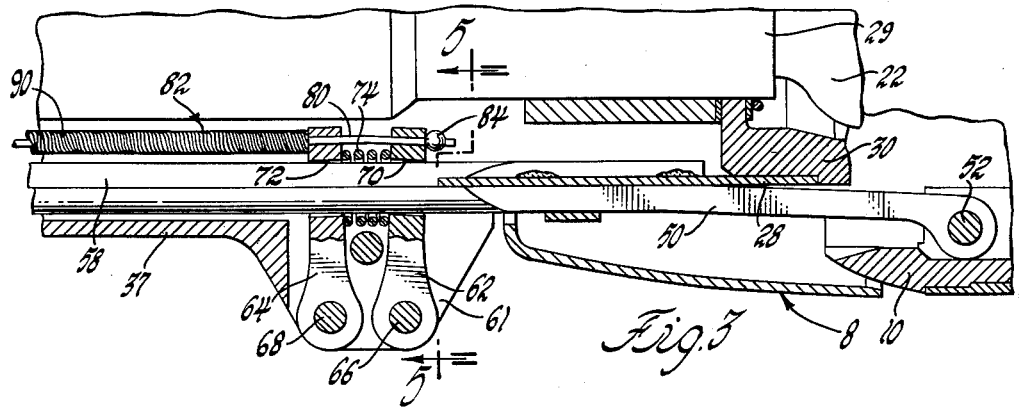
FIGURE 3 is a greatly enlarged view illustrating the details of the latching mechanism utilized in securing the tilting and telescoping mechanism in adjusted positions, with the parts thereof shown in the locking position.
Figure 4:
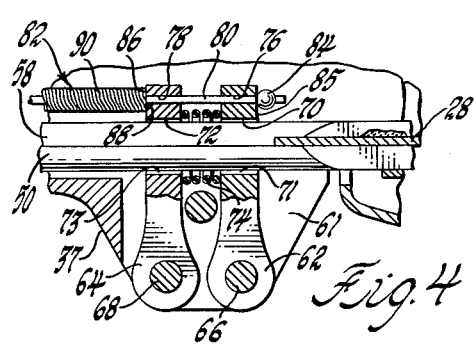
FIGURE 4 is a fragmentary view showing the latching mechanism in the released position.
Figure 5:
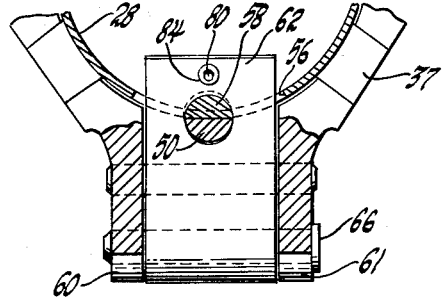
FIGURE 5 is a view looking in the direction of arrows 5—5 of FIGURE 3.

According to the principal feature of the invention, means are provided for concurrently locking and releasing both the telescoped positions of adjustment of jacket 28 and the tilted positions of adjustment of housing 10. As seen in the embodiment shown in FIGURES 2–5, the upper end of an elongated rod 50 of semi-circular cross section is pivotally connected to housing 10 by pivot shaft 52. The lower and intermediate portion of rod 50 projects axially into a slot 54 formed in the lower wall of housing 37. Jacket 28 in turn is formed with a notched portion 56 which is generally radially aligned with slot 54 and has a second rod 58 of semicircular cross section secured thereto in longitudinally aligned vertical overlapping relation with rod 50. Near its upper end, the lower wall of housing 37 is formed with depending laterally spaced ears 60 and 61 between which longitudinally spaced apart vertically extending paddle elements 62 and 64 are supported on transversely extending pivot shafts 66 and 68. Formed in the upper ends of paddles 62 and 64 are longitudinally extending drilled passages 70 and 72 which surround rods 50 and 58. As seen best in FIGURE 4, when paddle elements 62 and 64 are aligned in parallel relation, passages 70 and 72 provide concentric clearance gaps 71 and 73 enabling either concurrent or independent linear movement of rods 50 and 58 relative thereto. Conversely, as seen in FIGURE 3, when paddles 62 and 64 are displaced in angular opposite directions by the preload spring 74 disposed therebetween, passages 70 and 72 are cocked or angled relative to the cylindrical surface defined by the mating rods 50 and 58 so that frictional contact is established therewith. Because of this frictional contact and the continuing biasing effect of spring 74, linear movement of either rod in either direction results in increasing frictional engagement between the outer surface of each rod and the portion of the drilled passages in closest proximity thereto which thus effects a wedge locking action restraining linear movement of both rods 50 and 58. Inasmuch as the telescoping and tilting movement of jacket 28 and housing 10, respectively, are dependent upon linear displacement of the rods, it will be apparent that when the paddles are in the normal cocked positions shown in FIGURE 3, the jacket and housing will be rigidly maintained against either mode of movement from the position established.

In order to effect release of the locking engagement described above, in accordance with the invention the upper end portions of paddles 62 and 64 are provided with apertures 76 and 78 through which extend the free end of the drive wire 80 of Bowden cable assembly 82. The free end of wire 80 has a swedged ball 84 fastened thereto in abutting relation with upper face 85 of paddle 62, while the lower face 86 of paddle 64 directly abuts the upper end 88 of the Bowden cable sheath 90. The Bowden cable assembly proceeds downwardly from paddles 62 and 64 through the jacket 28 and emerges through an opening 92 from which it progresses in a curved path to pedal bracket 94 formed on the fire wall 12. The lower end of the sheath engages the forward face 96 of bracket 94 while the wire 80 proceeds through an aperture 100 in the face 96 and is secured by a locking nut 102 on ear 104 formed intermediately on pedal 14 between the fulcrum 106 and the pedal portion 108 thereof. Since the Bowden sheath 90 is arranged in a non-linear path, application of foot pressure on pedal assembly 14 not only displaces Bowden wire 80 rearwardly to swing paddle 62 to the position shown in FIGURE 4, but additionally imposes a reaction force through the Bowden sheath 90 which exerts an equal and opposite pressure on paddle 64 likewise urging it to the position shown in FIGURE 4. This equal and opposite effect results from the fact that when wire 80 is subjected to tension, it attempts to straighten out from the non-linear path and the Bowden sheath must straighten out a corresponding amount which, therefore, increases the effective linear distance thereof. Since only the end 88 thereof is capable of displacement, the displacement is reflected in corresponding displacement of paddle 64.

In operation, the assembly functions in the following manner. When the vehicle operator wishes to adjust either or both the axial and angular positions of the steering wheel 18, foot pressure is applied to pedal 14 sufficient to compress the biasing spring 74 between paddles 62 and 64. While the pedal is thus depressed, the operator grasps the wheel 18 and displaces it and the column 8 to the appropriate telescoped position within column 6 and either simultaneously or independently exerts appropriate manual pressure to incline the plane of rotation of wheel 18 to the most convenient position. Upon removal of pedal pressure, biasing spring 74 oppositely displaces paddles 62 and 64 to lock both rods 50 and 58 relative to each other and to housing 37 and thereby retains both the telescoped and tilted position of adjustment. With the construction shown, both the telescoping and tilting adjustment may, of course, be carried out either individually or simultaneously. It is to be particularly noted that in addition to the above versatility, the present construction possesses the significant advantage of enabling infinitely fine incremental steps of adjustment of either the telescoping or tilting positions and thus enables completely progressive variation in adjusted positions in contrast to the relative lack of selectivity permitted by conventional "stepped" latching mechanisms. It should further be noted that the present construction requires but one latching mechanism to afford the fullest advantage of infinitely variable positioning for both adjusting functions.

Figure 6:
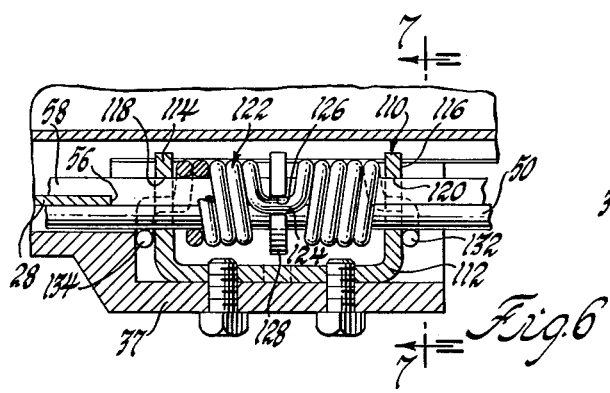
FIGURE 6 is an enlarged fragmentary view, partly in section, illustrating a modified form of latching and releasing mechanism.
Figure 7:
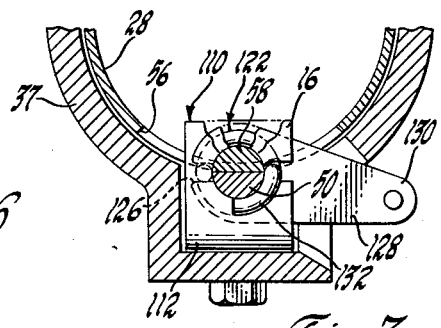
FIGURE 7 is a view looking in the direction of arrows 7—7 of FIGURE 6 illustrating the parts thereof in the locked position.
Figure 8:
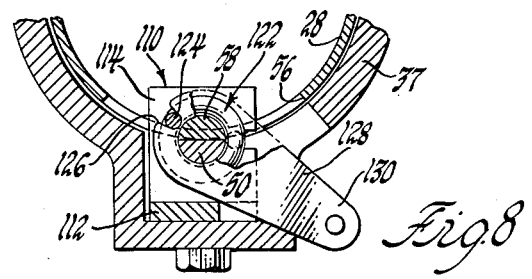
FIGURE 8 is a view similar to FIGURE 7 showing the parts thereof in the unlocked or released position.

In FIGURES 6, 7 and 8, there is shown a modification of the invention in which the paddle elements are replaced by a coil spring friction grip device 110. Device 110 comprises a bracket 112 having a pair of longitudinally spaced ears 114 and 116 formed with aligned apertures 118 and 120 which surround rods 50 and 58. Disposed between ears 114 and 116 and surroundingly embracing rods 50 and 58 is a coil spring element 122 having a central loop 124 which operatively engages a slot 126 formed in a lever element 128. Lever element 128 in turn surrounds rods 50 and 58 and is provided with an outer end portion 130 which is vertically displaceable in a plane normal to the axis of revolution of the coil spring 122. Spring 122 is initially wound to provide a relatively high level of clasping or gripping engagement with rods 50 and 58 when the lever element 128 is in the position shown in FIGURE 7 and thereby prevent relative linear movement of rods 50 and 58. However, upon downward displacement of lever 128 to the position shown in FIGURE 8, the central loop portion 126 is urged in a clockwise direction, while the anchored ends 132 and 134 thereof are restrained by ears 114 and 116. As a result, the internal diameter of the coil spring 122 is increased sufficiently to enable concurrent or individual linear movement of rods 50 and 58. Upon release of lever 128, spring 122 resumes its normal gripping engagement and prevents further displacement of either rod. It will be understood that lever 128 is connected to the pedal 112 by a conventional link and bell crank mechanism, not shown.

While two embodiments of the invention have been shown and described, it will be apparent that other changes and modifications may be made therein. It is, therefore, to be understood that it is not intended to limit the invention to the embodiments shown, but only by the scope of the claims which follow.

I claim:

1. In a steering column assembly having a fixed portion, a telescoping portion movable in said fixed portion and a tiltable portion pivotally mounted on said telescoping portion separate linearly displaceable means connected to said telescoping portion and said tiltable portion, and locking means on said fixed portion common to said linearly displaceable means operative to simultaneously establish fixed positions of adjustment of said telescoping and tiltable portions.

2. In a steering column assembly having a lower fixed portion, an intermediate portion telescopingly movable in said fixed portion and an upper portion tiltably mounted on said intermediate portion, separate linearly displaceable means connected to said telescoping portion and said tiltable portion, friction inducing locking means on said fixed portion common to said linearly displaceable means operative to simultaneously establish fixed positions of adjustment of said telescoping and tiltable portions, and means for disabling said locking means to enable readjustment of said telescoping and tiltable portions.

3. In a steering column assembly having a lower fixed portion, an intermediate portion telescopingly movable in said fixed portion and an upper portion tiltably mounted on said intermediate portion, separate linearly displaceable means connected to said telescoping and tiltable portions, said linearly displaceable means being arranged in side by side sliding relation, locking means surroundingly embracing both of said linearly displaceable means, said locking means being normally resiliently biased to a position effective to restrain sliding movement of said linearly displaceable means, and manually operable means for overcoming said resilient bias to enable independent and simultaneous sliding movement of said linearly displaceable means.

4. In a steering column assembly having a lower fixed portion, an intermediate portion telescopingly movable in said fixed portion and an upper portion tiltably mounted on said intermediate portion, separate linearly displaceable means connected to said telescoping and tiltable portions, said linearly displaceable means comprising first and second rods of semi-circular cross section arranged in side by side sliding relation, locking means on said fixed portion surroundingly embracing said rods, said locking means being normally resiliently biased to a position effective to restrain sliding movement of both of said rods relative to each other and to said fixed portions, and manually operable means for overcoming said resilient bias to enable independent and simultaneous sliding movement of said rods.

5. In a steering column assembly having a lower fixed portion, an intermediate portion telescopingly movable in said fixed portion and an upper portion tiltably mounted on said intermediate portion, separate linearly displaceable means connected to said telescoping and tiltable portions, said linearly displaceable means comprising first and second rods of semi-circular cross section arranged in side by side sliding relation to form a stacked assembly of circular cross section, locking means on said fixed portion surroundingly embracing said circular cross section, said locking means being normally resiliently biased to a position effective to restrain sliding movement of both of said rods relative to each other and to said fixed portion, and manually operable means for overcoming said resilient bias to enable independent and simultaneous sliding movement of said rods.

6. In a steering column assembly having a lower fixed portion, an intermediate portion telescopingly movable in said fixed portion and an upper portion including a steering wheel tiltably mounted on said intermediate portion, a first linearly displaceable rod member fixed to said telescoping portion in parallel relation with the axis of movement thereof, a second linearly displaceable rod member pivotally connected at one end to said tiltable portion, said rods being arranged in side by side sliding relation, locking means on said fixed portion surroundingly embracing both of said rod members, said locking means being normally resiliently biased to a position effective to restrain sliding movement of said rod members, and manually operable means for overcoming said resilient bias to enable independent and simultaneous sliding movement of said linearly displaceable means.

7. In a steering column assembly having a lower fixed portion, an intermediate portion telescopingly movable in said fixed portion and an upper portion including a steering wheel tiltably mounted on said intermediate portion, a first linearly displaceable rod member fixed to said telescoping portion in parallel relation with the axis of movement thereof, a second linearly displaceable rod member pivotally connected at one end to said tiltable portion, said rods being arranged in side by side sliding relation, locking means on said fixed portion surroundingly embracing both of said rod members, said locking means being normally resiliently biased to a position effective to restrain sliding movement of said rod members, and pedal operated means for overcoming said resilient bias to enable independent and simultaneous sliding movement of said linearly displaceable means.

8. A steering column assembly comprising, a lower fixed portion, an intermediate portion telescopingly movable in said fixed portion and an upper portion tiltably mounted on said intermediate portion, a first rod member fixed to said telescoping portion, a second rod member pivotally connected to said tiltable portion, said rod members being semi-circular in cross section and arranged in side by side sliding relation, locking means pivotally mounted on said fixed portion surroundingly embracing both of said rod members intermediate the length thereof, said locking means being normally resiliently biased to a position effective to restrain sliding movement of both of said rods relative to each other and to said fixed portion, and pedal actuated operating means for overcoming said resilient bias to enable independent and simultaneous sliding movement of said linearly displaceable means.

9. A steering column assembly comprising, a fixed lower portion, an intermediate portion telescopingly movable in said fixed portion and an upper portion tiltably mounted on said intermediate portion, a first rod fixed to said telescoping portion, a second rod pivotally connected at one end to said tiltable portion, said rods being arranged in side by side sliding relation, a pair of locking paddles pivotally mounted in spaced relation on said fixed portion, passage means in said paddles surroundingly embracing both of said rods, said paddles being normally resiliently biased in opposite directions to positions effective to restrain sliding movement of said rods, and manually operable means for overcoming said resilient bias to enable independent and simultaneous sliding movement of said linearly displaceable means.

10. A steering column assembly comprising, a fixed lower portion, an intermediate portion telescopingly movable in said fixed portion and an upper portion tiltably mounted on said intermediate portion, a first rod fixed to said telescoping portion, a second rod pivotally connected at one end to said tiltable portion, said rods being arranged in side by side sliding relation, a pair of locking paddles pivotally mounted in spaced relation on said fixed portion, passage means in said paddles surroundingly embracing both of said rods, said paddles being normally resiliently biased in opposite directions to positions effective to restrain sliding movement of said rods, a cable, and a sheath around said cable, said cable and sheath coacting with said paddles for overcoming said resilient bias to enable independent and simultaneous sliding movement of said rods.

11. The structure set forth in claim 10 wherein said paddles are formed with aligned openings through which one end of the cable extends, the terminal end of the cable being formed with a lug abuttingly engaging one of said paddles while one end of the sheath abuttingly engages the other of said paddles.

12. The structure set forth in claim 11 wherein the other end of the cable is operatively connected to a pedal member and the other end of the sheath abuts a fixed member located with reference to the other of said paddles so that the sheath occupies a non-linear path.

13. In a steering column assembly having a fixed lower portion, an intermediate portion telescopingly movable in said fixed portion and an upper portion tiltably mounted on said intermediate portion, a first rod fixed to said telescoping portion, a second rod pivotally connected to said tiltable portion, said rods being semi-circular in cross section and arranged in side by side sliding relation, self-actuating friction locking means mounted on said fixed portion surroundingly embracing both of said rods, said locking means normally restraining sliding movement of said rods, and manually operable means for overcoming said friction locking to enable independent and simultaneous sliding movement of said rods.

14. The structure set forth in claim 13 wherein said self-actuating friction locking means comprises a coil spring surrounding said rods, said spring being anchored at its opposite ends in said fixed portion and normally resiliently gripping both of said rods.

15. The structure set forth in claim 14 including lever means operative to angularly displace the central portion of said spring in a direction which expands the inner diameter thereof.

References Cited by the Examiner
UNITED STATES PATENTS

| | | | |
|---|---|---|---|
| 2,845,810 | 8/1958 | Sampson | 74—493 |
| 2,910,887 | 11/1959 | Helms | 74—493 |

MILTON KAUFMAN, *Primary Examiner.*